United States Patent [19]

Wills et al.

[11] 4,214,683

[45] Jul. 29, 1980

[54] ILLUMINATED WHEEL COVER

[75] Inventors: Jack D. Wills; Frank R. Clarkson, both of Peoria, Ill.

[73] Assignee: Tale-Lite Systems, Inc., Peoria, Ill.

[21] Appl. No.: 960,569

[22] Filed: Nov. 14, 1978

Related U.S. Application Data

[63] Continuation of Ser. No. 856,311, Dec. 1, 1977, abandoned.

[51] Int. Cl.² .............................................. B62D 43/02
[52] U.S. Cl. ...................... 224/42.2; 40/587; 362/61
[58] Field of Search ............ 224/42.2, 29 R, 42.45 R, 224/273; 362/78, 42, 61; 40/587, 209, 204, 206, 205

[56] References Cited

U.S. PATENT DOCUMENTS

| 1,543,995 | 6/1925 | Fisher | 224/42.2 |
| 1,724,281 | 8/1929 | Hathorn | 40/587 X |
| 1,777,719 | 10/1930 | Duffus | 40/587 |
| 2,072,490 | 3/1937 | Whaley | 40/587 |
| 2,632,268 | 3/1953 | Schroeder | 40/587 |

Primary Examiner—David A. Scherbel
Assistant Examiner—Jerold M. Forsberg
Attorney, Agent, or Firm—James R. Bell

[57] ABSTRACT

An illuminated wheel cover includes a light-penetrable member having indicia thereon. The member may be mounted on an exposed spare wheel of a vehicle. Light passed through the member enhances the indicia. The wheel is protected by the cover and the light-penetrable member aesthetically provides an added lighting feature for nighttime operation of the vehicle.

3 Claims, 7 Drawing Figures

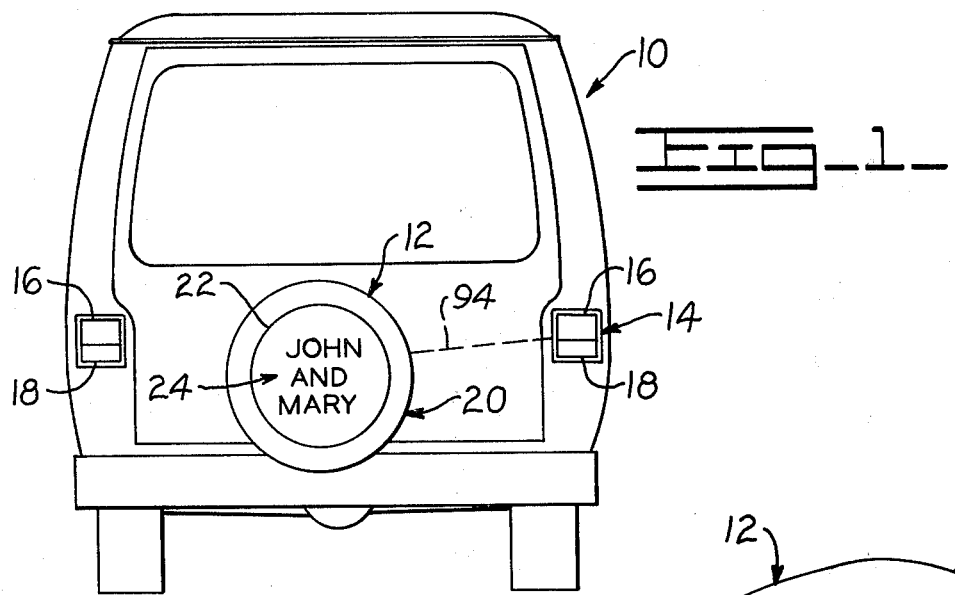
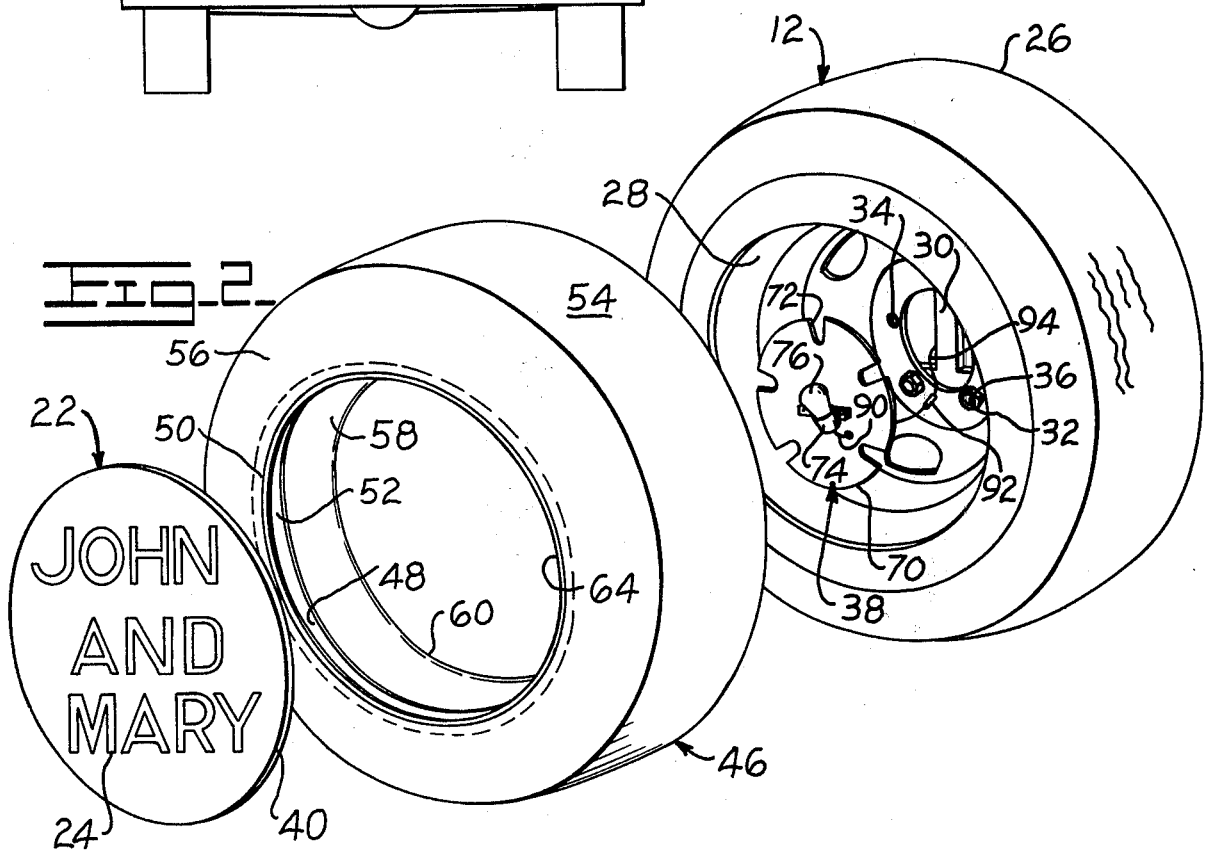
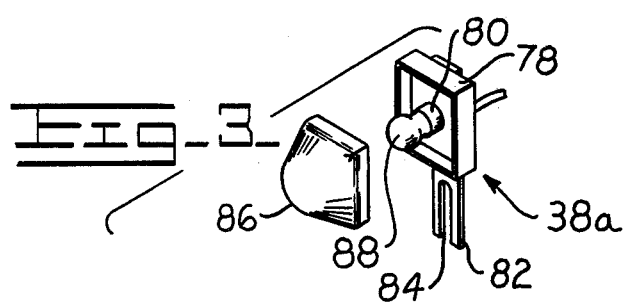

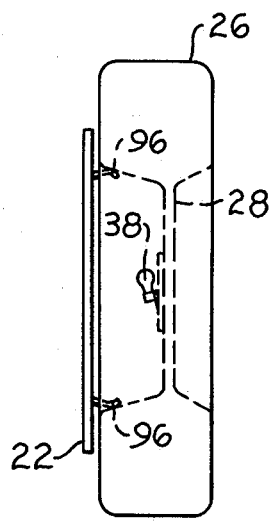
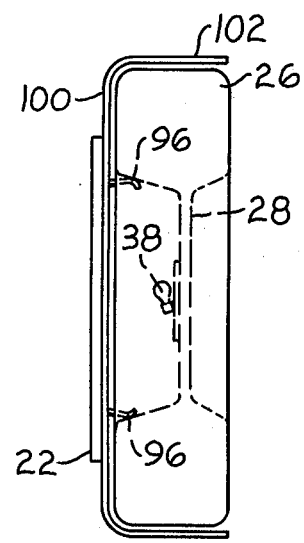
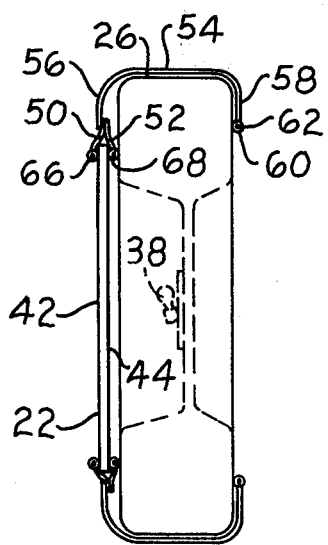
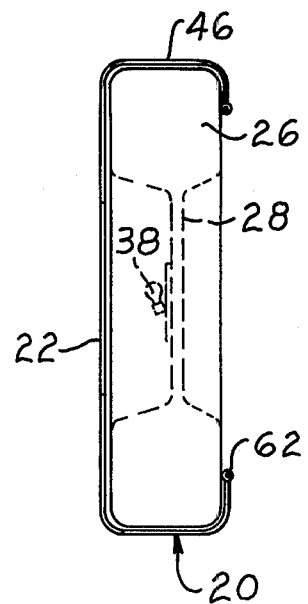

ILLUMINATED WHEEL COVER

This is a continuation of application Ser. No. 856,311 filed Dec. 1, 1977, now abandoned.

BACKGROUND OF THE INVENTION

1. Field of the Invention

This invention relates generally to package and article carriers and more particularly to vehicles having a wheel or tire carrier.

2. Description of the Prior Art

The increasing popularity of recreational type vehicles has produced an increasing demand for accessories for such vehicles. Some of these accessories are useful or safety related but most are only aesthetic. One well known accessory is a flexible wheel cover for spare wheels carried externally by such vehicles usually on the rear of the vehicle in an exposed manner. These wheel covers are provided to protect such spare wheels from the elements. To add aesthetic value to such covers, readily visible personalized messages are sometimes applied thereto. However, such flexible wheel covers have not been provided with a substantially rigid, light-penetrable portion used in association with a light source on the vehicle.

In view of the above, it would be advantageous to provide a vehicle wheel cover for exposed spare wheels which provides protective and aesthetic related value not known or achieved by the prior art.

SUMMARY OF THE INVENTION

The present invention is directed to overcoming one or more of the problems as set forth above.

According to the present invention this is accomplished by providing a flexible wheel cover having a pair of flaps defining an opening in the flexible cover. The cover includes a light-penetrable member retained in the opening by the flaps. A light source is mounted adjacent the opening.

The foregoing and other advantages will become apparent from the following-detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 1 is an end view of a vehicle illustrating the wheel cover of this invention mounted on an exposed spare vehicle wheel;

FIG. 2 is an isometric view illustrating the wheel cover of this invention and an associated spare vehicle wheel;

FIG. 3 is an isometric view illustrating a light emitting device which can be used with the wheel cover of this invention;

FIG. 4 is a cross-sectional side elevation graphically illustrating an alternative embodiment of this invention;

FIG. 5 is a cross-sectional side elevation graphically illustrating another alternative embodiment of this invention;

FIG. 6 is a cross-sectional side elevation graphically illustrating the preferred embodiment of this invention; and FIG. 7 is a cross-sectional side elevation graphically illustrating a further alternative embodiment of this invention.

DETAILED DESCRIPTION

Referring now to the drawings, FIG. 1 illustrates a vehicle generally designated 10 including an exposed spare wheel 12 mounted thereon by a bracket or the like discussed later herein. The vehicle 10, as it is well known, has a self-contained electrical system which includes taillights 14. The taillights 14 include running light portions 16 which may be selectively turned on and off in response to the vehicle operator actuating a switch. Such running lights aid in causing the vehicle to be more visible, especially during hours of darkness. The taillights 14 also include brake light portions 18 which are automatically turned on in response to the vehicle brakes being actuated. The spare wheel 12 has a wheel cover 20 mounted thereon. Wheel cover 20 includes an insert member 22 having indicia thereon displaying, for example, a personalized message such as "John and Mary," generally designated 24.

In FIG. 2, the spare wheel 12 and wheel cover 20 including insert 22 are shown in exploded view. The wheel 12, as it is well known, includes a tire portion 26 mounted on a wheel rim 28 connected to a bracket 30 by lugs 32 extending through lug holes 34. The lugs are secured to the rim 28 by lug nuts 36 in the well known manner. Also, a light source generally designated 38 is adapted to be mounted on the wheel 12 as will be discussed later in greater detail.

In the preferred embodiment of this invention, as illustrated in FIGS. 1, 2 and 6, insert 22 is preferably a rigid disc-like member formed of light-penetrable or translucent material. The insert 22 generally has an annular periphery 40 although this may be varied to other geometric shapes if desired. Insert 22 also includes opposite sides 42, 44 as best shown in FIG. 6. A synthetic plastic-like material which is capable of being molded and/or cut to desired sizes is preferred, for example, the synthetic resin material sold under the trademark PLEXIGLAS. The insert material may also be color tinted or may be of no discernable color if desired. The preferred thickness of the insert 22 is from about 0.080" to about 0.125".

The insert 22 carries indicia 24 thereon. The indicia may display a personalized message as illustrated in FIGS. 1 and 2 or may display a pictorial scene or design. Of course, a wide range of types and styles of indicia 24 may be applied to insert 22 if desired. As for applying the indicia 24 onto insert 22, this may be accomplished by a wide variety of well known methods. Indicia may be hand-painted, screen-printed or molded into insert 22 in a multi-colored application. Also, a well known vinyl pressure-sensitive applied indicia or design may be applied onto insert 22. The main prerequisite for the indicia is that it be substantially non-light-penetrable or less light-penetrable relative to the insert 22. It is to be understood however that, alternatively, insert 22 can be substantially non-light-penetrable or less light-penetrable than the indicia 24. In either case, one or the other of the insert 22 or indicia 24 provides a defined portion through which light may be penetrated to enhance the visibility of indicia 24.

Means are provided for attaching insert 22 to spare wheel 12. Such means preferably comprises a flexible wheel cover portion 46 having a pocket 48 formed therein for receiving and retaining insert 22, see FIGS.

2 and 6. Pocket 48 includes flexible means such as flaps 50, 52 for releasably engaging opposite sides 42, 44, respectively, of insert 22. Flexible wheel cover portion 46 is generally provided for the purpose of protecting tire 26 from the elements. The preferred materials for the cover portion 46 are substantially non-porous, flexible, synthetic materials of from about 14 to about 24 gauge, for example, the synthetic vinyl-like material sold under the trademark NAUGAHYD. Any suitable rubberized, plasticized, canvas or vinyl-like materials may be used.

As shown in FIGS. 2 and 6, cover portion 46 is provided to fit over tire 26. Thus, since many tire sizes are available, cover portion 46 may be provided in various sizes. Possibly, however, a single stretch-type cover portion 46 could be provided for a one-size-fits-all situation. Cover portion 46 generally comprises a flexible circumferential portion 54 and two opposed sidewall portions 56,58. Annular opening 60 of sidewall 58 is peripherally bound by an elastic bead 62 retained thereby. Bead 62 may be stretched or expanded to permit removal of cover portion 46 from tire 26. However, bead 62 will tend to contract as far as permitted by sidewall 58 thus causing cover portion 46 to be retained on tire 26, see FIG. 6.

Sidewall 56 terminates at two opposed flaps 50,52 attached to sidewall 56 and defining annular opening 64 peripherally bound by elastic bead 66 retained by flap 50 and elastic bead 68 retained by flap 52. Beads 66,68 are similar to bead 62 described above and may be stretched or expanded to permit removal of insert 22 from pocket 48. However, beads 66,68 will tend to contract as far as permitted by flaps 50,52 thus releasably engaging opposite sides 42,44, respectively, of insert 22. In this manner, insert 22 is readily accessible to removal or mounting in cover portion 46.

Means are provided for passing or penetrating light through light-penetrable insert 22 for enhancing the visibility of inidicia 24. Such means preferably comprises a light source such as that shown at 38, FIG. 2, or in a modified form at 38a in FIG. 3. Light source 38 is adapted to be carried by spare wheel 12 and is electrically connected to the electrical system of the associated vehicle 10. In this manner, light source 38 is adjacent insert 22 when the cover 20 is mounted on wheel 12.

Light source 38 may comprise mounting plates 70,82 preferably formed of an electrically conductive material and adapted to be mounted on and grounded to wheel rim 28. To accomplish this, slots 72 are provided in plate 70 and are circumferentially spaced for mating engagement with lugs 32. Thus, plate 70 can be secured to lugs 32 by lug nuts 36.

A commonly available receptacle 74 can be secured to plate 70 by any suitable conventional securing means. A light bulb 76, preferably having from about 15 to about 32 candlepower illuminating strength, is received in receptacle 74. Such light bulbs are well known for automotive use. Also, modified light source 38a, FIG. 3, includes a housing 78, light bulb receptacle 80, bulb 88, mounting plate 82 having a slot 84 for multi-positionable mounting and a reflective cover 86 of a well known plastic or other synthetic material. Cover 86 is especially desirable to protect bulb 88 and receptacle 80 from the elements.

Returning now to FIG. 2, a wire 90, such as that commonly used in automotive electrical systems, is connected to receptacle 74. A commonly known male-female quick connect-disconnect device 92 is preferably used to permit the electrical connection of wire 90 to wire 94. Wire 94, or a similar or the same type as wire 90, is connected to the automotive electrical system as illustrated in FIG. 1. Preferably wire 94 connects to running light portions 16 so that insert 22 will be illuminated when the automotive lights are switched on. However, it is possible though not preferable to connect wire 94 to brake light portion 18 so that insert 22 will be illuminated only when the vehicle brakes are applied. Connection of wire 94 to the automotive electrical system may be accomplished in any well known manner such as splicing, or using alligator-type clips or the like. Of course, the desirable objective of this electrical connection is that it can be of temporary or quick connect-disconnect type such as is commonly used in making electrical connection between an automotive vehicle and, for example, a small trailer. Thus, it an be seen that there are several well known alternatives available for making such connection.

Alternatively, it is possible, but not preferable, to mount insert 22 directly on wheel rim 28 by the use of spring stell clips 96, see FIG. 4. Mounting in this way is similar to mounting a commonly known hub cap to a wheel. Light source 38 is mounted on wheel rim 28 adjacent insert 22.

Also, as shown in FIG. 5, insert 22 can alternatively be formed as a unit with a substantially rigid wheel cover 100 having an annular circumferential portion 102 for covering tire 26. Such a unit can be mounted by spring steel clips 96 as previously discussed. Similarly, light source 38 is mounted on wheel rim 28 adjacent insert 22.

As a further alternative, it is possible to have insert 22 formed as a flexible member rather than a rigid member, see FIG. 7. In this case, the entire wheel cover 20 could be formed as a flexible unit having cover portion 46 retained on tire 26 by an elastic bead 62 similar to the preferred embodiment of FIG. 6. However, a flexible insert 22 would not be as readily removable or replaceable relative to cover portion 46. Also, it is believed that a flexible insert 22 would undesirably distort the indicia thereon.

In operation, it can be seen that a flexible wheel cover portion 46 can be mounted on spare wheel 12. A light source such as that shown at 38 or 38a can be mounted on wheel rim 28 adjacent insert 22 and electrically connected to the electrical system of the associated vehicle 10. Flexible pocket 48 having flaps 50,52 and elastic beads 66,68 releasably engage and retain opposite sides 42,44, respectively, of insert 22 as is best illustrated in FIG. 6. Flexible pocket 48 permits insert 22 to be quickly and easily removed or inserted. A variety of differently designed inserts could be interchangeably used with the same cover portion 46. Also, various colored light bulbs 76 can be interchangeably used to provide varying lighting effects as may be desired.

The foregoing has described a vehicle wheel cover for exposed spare wheels. The cover includes a light-penetrable portion having indicia thereon. The light-penetrable portion can be illuminated to enhance the indicia. As a result, the wheel cover usefully provides protective, aesthetic and safety related value.

LIST OF ELEMENTS
Illuminated Wheel Cover
File No. 77-103

| | | | |
|---|---|---|---|
| 10 | vehicle | 60 | opening |
| 12 | spare wheel | 62 | elastic bead |
| 14 | taillights | 64 | opening |
| 16 | running light portion | 66 | elastic bead on 50 |
| 18 | brake light portion | 68 | elastic bead on 52 |
| 20 | wheel cover | 70 | mounting plate |
| 22 | insert member | 72 | slots |
| 24 | indicia | 74 | receptacle |
| 26 | tire portion | 76 | light bulb |
| 28 | wheel rim | 78 | housing |
| 30 | bracket | 80 | receptacle |
| 32 | lugs | 82 | mounting plate |
| 34 | lug holes | 84 | slot |
| 36 | lug nuts | 86 | cover |
| 38 | light source | 88 | bulb |
| 38a | modified light source | 90 | wire |
| 40 | periphery of insert 22 | 92 | disconnect device |
| 42 | side of insert 22 | 94 | wire |
| 44 | another side of insert 22 | 96 | spring clips |
| 46 | wheel cover portion | 100 | rigid wheel cover |
| 48 | pocket | 102 | circumferential portion |
| 50 | flap | | |
| 52 | flap | | |
| 54 | circumference | | |
| 56 | sidewall | | |
| 58 | sidewall | | |

The embodiments of the invention in which an exclusive property or privilege is claimed are defined as follows:

1. A cover (20) for a spare (12) mounted on the exterior of an associated vehicle (10), said spare (12) including a tire (26) mounted on a wheel (28), said vehicle (10) having a light source (38) mounted adjacent the center of wheel (28), comprising:

a flexible cover (46) including a circumferential portion (54) and opposed side wall portions (56,58), said cover (46) mounted on and supported by said tire (26) and being of a construction sufficient for covering said tire (26) and exposing said wheel (28) and said light source (38);

one of said sidewalls (56) terminating at side-by-side flaps (50,52) defining an opening (64) exposing said wheel (28) and said light source (38);

a first one of said flaps (52) being adjacent said tire (26) and a second one of said flaps (50) being adjacent said first flap (52):

a resilient bead (66) in said second flap (50), said bead (66) being of a construction sufficient for radially exapnding and contracting said opening (64); and a light penetrable portion (22) covering said opening (64), said light penetrable portion having a peripheral edge (40) mounted between said flaps (50,52), said bead (66) being radially expandable for permitting edge (40) to be mounted in and removed from between said flaps (50,52), and said bead (66) being radially contractable for retaining edge (40) between said flaps (50,52).

2. The cover (20) of claim 1 wherein the light-penetrable portion (22) is substantially rigid.

3. The cover (20) of claim 1 wherein said light source (38) is connected to an electrical system on said associated vehicle 10.

* * * * *